United States Patent
Huang et al.

(10) Patent No.: US 12,275,832 B2
(45) Date of Patent: Apr. 15, 2025

(54) FLUORINE-CONTAINING ELASTOMER COMPOSITION AND METHOD FOR MAKING CURED FLUORINE-CONTAINING ELASTOMER COMPOSITION

(71) Applicant: TAIWAN SEMICONDUCTOR MANUFACTURING COMPANY LTD., Hsinchu (TW)

(72) Inventors: Chung-Ming Huang, Tainan (TW); Ren-Guan Duan, Hsinchu (TW); Chen-Hsiang Lu, Hsin-Chu (TW); Tien-Chih Cheng, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/821,801

(22) Filed: Aug. 24, 2022

(65) Prior Publication Data
US 2024/0067796 A1    Feb. 29, 2024

(51) Int. Cl.
| | | |
|---|---|---|
| *C08K 3/14* | (2006.01) | |
| *C08K 3/11* | (2018.01) | |
| *C08K 3/22* | (2006.01) | |
| *C08K 3/36* | (2006.01) | |
| *C08K 3/38* | (2006.01) | |

(52) U.S. Cl.
CPC ............... *C08K 3/14* (2013.01); *C08K 3/11* (2018.01); *C08K 3/22* (2013.01); *C08K 3/36* (2013.01); *C08K 3/38* (2013.01); *C08K 2003/221* (2013.01); *C08K 2003/2241* (2013.01)

(58) Field of Classification Search
CPC ................................ C08K 3/105; C08K 3/22
See application file for complete search history.

(56) References Cited

FOREIGN PATENT DOCUMENTS

JP    2017179210 A    * 10/2017

OTHER PUBLICATIONS

Machine translation of JP-2017179210-A (Year: 2017).*

* cited by examiner

*Primary Examiner* — Wenwen Cai
(74) *Attorney, Agent, or Firm* — WPAT LAW; Anthony King

(57) ABSTRACT

A fluorine-containing elastomer composition includes a curable fluorine-containing polymer comprising at least one fluorinated cure site monomer having a cure site; an group IIIB element-containing reinforcing additive in an amount of 8 to 15 weight parts with respect to 100 weight parts of the curable fluorine-containing polymer; and a curative configured for curing the at least one fluorinated cure site monomer.

20 Claims, 7 Drawing Sheets

FLUORINE-CONTAINING ELASTOMER COMPOSITION AND METHOD FOR MAKING CURED FLUORINE-CONTAINING ELASTOMER COMPOSITION

BACKGROUND

Semiconductor manufacturing involves the use of various sealed processing chambers in cleanroom environments. Processes such as chemical vapor deposition and plasma deposition require the use of vacuum chambers and similar reactors, in which corrosive chemicals, high-energy plasmas, radiations such as ultra-violet (UV) light are used to create harsh environments. Any contamination such as particles should be avoided inside and outside the processing chambers because the contamination impacts the resulting semiconductor wafers and devices.

Resilient sealing rings made of a polymer material are used for adequately sealing a processing chamber. Such sealing rings are important due to the harsh environments within the processing chamber. The sealing rings maintain the processing chamber in vacuum or under a pressure, keep such chemicals safely within the chamber, and prevent impurities from outside the chamber from entering the chamber.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
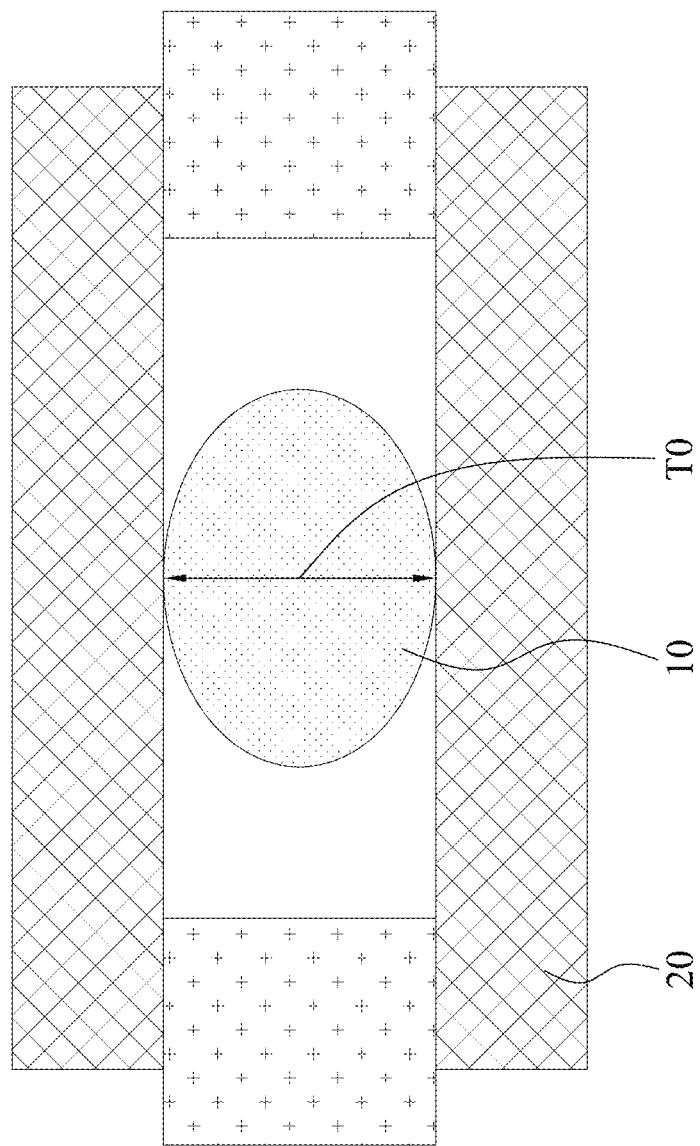
FIGS. 1A to 1C are schematic views illustrating various steps of performing a compression set test.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, but these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Embodiments of the present disclosure discuss a fluorine-containing elastomer composition including a curable fluorine-containing polymer, a group IIIB element-containing reinforcing additive, and a curative configured for curing the at least one fluorinated cure site monomer. With the design of group IIIB element-containing fillers mixed in the cured fluorine-containing composition in accordance with some embodiments of the present disclosure, the as-formed molded articles have improved properties, for example, having acceptable compression set and showing excellent plasma resistant abilities.

The present disclosure provides a fluorine-containing elastomer composition. Various molded articles may be made from the fluorine-containing elastomer composition, for example, articles useful for sealing semiconductor equipment, such as an O-ring, may be made from the fluorine-containing elastomer composition in accordance with some embodiments of the present disclosure.

In some embodiments, a fluorine-containing elastomer composition includes a curable fluorine-containing polymer, a group IIIB element-containing reinforcing additive, and a curative configured for curing the at least one fluorinated cure site monomer. In some embodiments, the group IIIB element-containing reinforcing additive may be or include an yttrium-containing reinforcing additive, a gadolinium-containing reinforcing additive, an erbium-containing reinforcing additive, or a combination thereof.

The curable fluorine-containing polymer may include at least one fluorinated cure site monomer having a cure site. In some embodiments, the cure site may be or include a functional group selected from a group consisting of a chloro group, a bromo group, an iodine group, a cyano group, a nitrile group, a carboxyl group, a phenoxy group, a carbonyl group, and an alkoxycarbonyl group. In some embodiments, the at least one fluorinated cure site monomer has at least one functional group, and the curable fluorine-containing polymer may be cross-linked using a suitable curative through reacting the functional group. In some embodiments, the cure site may be referred to as the aforesaid function group. In some embodiments, the at least one fluorinated cure site monomer has a halogenated functional cure site group, and the halide may come off when the curable fluorine-containing polymer is cross-linked using a suitable curative through reacting the cure site.

In some embodiments, the curable fluorine-containing polymer includes a perfluoroelastomer (FFKM), a fluoroelastomer (FKM), a fluoro vinyl methyl siloxane (FVMQ), or a combination thereof. References to a "perfluoroelastomer" or "FFKM" made below will be understood to encompass an elastomer containing perfluorinated monomers as defined in ASTM D1418. FFKMs may include moieties from perfluorinated monomers such as tetrafluoroethylene (TFE) and perfluoroalkylvinylether (PAVE) (e.g., PMVE) and at least one perfluorinated cure site monomer (CSM).

The curative configured for curing the at least one fluorinated cure site monomer may be a crosslinking agent, a curing agent, or the like. Examples of a suitable curative include, but are not limited to diaminobisphenol AF, 3,3'-diaminobenzidine. 2,2-bis(3,4-diaminophenyl)hexafluoropropane, 2,2-bis [3-amino-4-(N-methylamino)phenyl]hexafluoropropane, 2,2-bis [3-amino-4-(N-ethylamino)phenyl]hexafluoropropane, 2,2-bis [3-amino-4-(N-propylamino)phenyl]hexafluoropropane, 2,2-bis [3-amino-4-(N-phenylamino)phenyl]hexafluoropropane, 2,2-bis [3-amino-4-(N-perfluorophenylamino)phenyl]hexafluoropropane, 2,2-bis [3-amino-4-(N-benzylamino)phenyl]hexafluoropropane, triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate, and the like.

In some embodiments, the curable fluorine-containing polymer includes FFKMs which contain cure site monomers having reactive cure site groups. In some embodiments, FFKMs can be cured by a curative such as bisamidoxime, bisamidrazone, bisaminophenol, bisaminothiophenol or bis-diaminophenyl compound, which may react with a nitrile group, a carboxyl group or an alkoxycarbonyl group and form an oxazole ring, a thiazole ring, an imidazole ring or a triazine ring to provide a cross-linked structure. In some embodiments, the curable fluorine-containing polymer includes FFKMs which contain cure site monomers having halogenated functional cure site groups, such FFKMs can be cured by a curative such as isocyanurate. In some embodiments, triallyl isocyanurate (TAIL) is used.

In some embodiments, the group IIIB element-containing reinforcing additive is in an amount of 8 to 15 weight parts with respect to 100 weight parts of the curable fluorine-containing polymer. In some embodiments, the group IIIB element-containing reinforcing additive is in an amount of about 8 to 14 weight parts, about 8 to 12 weight parts, about 9 to 14 weight parts, about 9 to 12 weight parts, about 10 to 13 weight parts, or about 10 to 12 weight parts with respect to 100 weight parts of the curable fluorine-containing polymer. In some embodiments, the group IIIB element-containing reinforcing additive is in an amount of about 10 weight parts with respect to 100 weight parts of the curable fluorine-containing polymer.

In some embodiments, the group IIIB element-containing reinforcing additive includes a mixture of a first additive and a second additive different from the first additive. In some embodiments, the first additive is a group IIIB element-containing additive, and the second additive is a group IIIB element-free additive. In some embodiments, the first additive is an yttrium-containing additive, and the second additive is an yttrium-free additive. In some embodiments, the first additive includes a plurality of group IIIB element-containing fillers, and the second additive includes a plurality of group IIIB element-free fillers. In some embodiments, the first additive includes a plurality of group IIIB element-containing fillers, and the second additive includes a plurality of group IIIB element-free fillers. In some embodiments, the group IIIB element-containing reinforcing additive may be free of the second additive (e.g., free of the group IIIB element-free additive or the group IIIB element-free fillers). The group IIIB element-free fillers may serve as carrier fillers. However, in some embodiments, the fluorine-containing elastomer composition may further include carrier fillers that are also group IIIB element-containing fillers.

In some embodiments, the group IIIB element-containing fillers are in an amount of about 8 to 12 weight parts with respect to 100 weight parts of the curable fluorine-containing polymer. In some embodiments, the group IIIB element-containing fillers are in an amount of about 9 to 11 weight parts with respect to 100 weight parts of the curable fluorine-containing polymer. In some embodiments, the group IIIB element-containing fillers are in an amount of about 10 weight parts with respect to 100 weight parts of the curable fluorine-containing polymer.

In some embodiments, the first additive includes yttrium oxide ($Y_2O_3$), yttrium aluminum monoclinic (YAM), yttrium aluminum garnet (YAG), yttrium oxyfluoride (YOF), yttrium fluoride ($YF_3$), yttrium aluminum perovskite (YAP), erbium oxide ($Er_2O_3$), gadolinium oxide ($Gd_2O_3$), or a combination thereof. In some embodiments, the group IIIB element-containing fillers include a material selected from a group consisting of yttrium oxide ($Y_2O_3$), yttrium aluminum monoclinic (YAM), yttrium aluminum garnet (YAG), yttrium oxyfluoride (YOF), yttrium fluoride ($YF_3$), yttrium aluminum perovskite (YAP), erbium oxide ($Er_2O_3$), and gadolinium oxide ($Gd_2O_3$). In some embodiments, the first additive has an average particle size of about 15 nm to about 3.5 μm or about 20 nm to about 3 μm. In some embodiments, the first additive has an average particle size of about 15 nm to about 60 nm, about 20 nm to about 50 nm, about 0.5 μm to about 3.5 μm, or about 1 μm to about 3 μm. In some embodiments, the group IIIB element-containing fillers have an average particle size of about 15 nm to about 3.5 μm or about 20 nm to about 3 μm. In some embodiments, the group IIIB element-containing fillers have an average particle size of about 15 nm to about 60 nm, about 20 nm to about 50 nm, about 0.5 μm to about 3.5 μm, or about 1 μm to about 3 μm.

In some embodiments, the group IIIB element-free fillers are in an amount of less than 3 weight parts with respect to 100 weight parts of the curable fluorine-containing polymer. In some embodiments, the group IIIB element-free fillers are in an amount of about 0.5 to 3 weight parts, about 1 to 2.5 weight parts, about 1.5 to 2 weight parts, or about 2 weight parts with respect to 100 weight parts of the curable fluorine-containing polymer. In some embodiments, an amount in weight parts of the first additive (or the group IIIB element-containing fillers) is about 3 to 7 times, about 4 to 6 times, or about 5 times an amount in weight parts of the second additive (or the group IIIB element-free fillers). In some embodiments, an amount in weight parts of the second additive (or the group IIIB element-free fillers) is greater than 0 to about 0.3 times an amount in weight parts of the first additive (or the group IIIB element-containing fillers). In some embodiments, an amount in weight parts of the second additive (or the group IIIB element-free fillers) is about 0.01 to 0.28 times, about 0.05 to 0.25 times, about 0.1 to 0.22 times, or about 0.2 times an amount in weight parts of the first additive (or the group IIIB element-containing fillers).

In some embodiments, the second additive includes carbon black, silicon carbide, aluminum carbide, titanium carbide, silicon oxide, titanium oxide, aluminum oxide, or a combination thereof. In some embodiments, the group IIIB element-free fillers (or the carrier fillers) include carbon black, silicon carbide, aluminum carbide, titanium carbide, silicon oxide, titanium oxide, aluminum oxide, or a combination thereof. In some embodiments, the second additive has an average particle size of about 12 nm to about 20 nm, about 14 nm to about 18 nm, or about 16 nm. In some embodiments, the group IIIB element-free fillers have an average particle size of about 12 nm to about 20 nm, about 14 nm to about 18 nm, or about 16 nm. In some embodiments, a ratio of an average particle size of the first additive to an average particle size of the second additive is greater than 1. In some embodiments, a ratio of an average particle size of the first additive to an average particle size of the second additive is about 1.25 to about 190, or about 3 to about 80.

The present disclosure further provides a method for making a cured fluorine-containing elastomer composition. Various molded articles may be made from the cured fluorine-containing elastomer composition, for example, articles useful for sealing semiconductor equipment, such as an O-ring, may be made from the cured fluorine-containing elastomer composition in accordance with some embodiments of the present disclosure.

In some embodiments, a method for making a cured fluorine-containing elastomer composition may include preparing a fluorine-containing elastomer composition and curing the fluorine-containing elastomer composition. The fluorine-containing elastomer composition may include a curable fluorine-containing polymer including at least one fluorinated cure site monomer having a cure site, a plurality of group IIIB element-containing fillers, and a curative configured for curing the at least one fluorinated cure site monomer.

In some embodiments, the curable fluorine-containing polymer includes a perfluoroelastomer (FFKM), a fluoroelastomer (FKM), a fluoro vinyl methyl siloxane (FVMQ), or a combination thereof. References to a "perfluoroelastomer" or "FFKM" made below will be understood to encompass an elastomer containing perfluorinated monomers as defined in ASTM D1418. FFKMs may include moieties from perfluorinated monomers such as tetrafluoroethylene (TFE) and perfluoroalkylvinylether (PAVE) (e.g., PMVE) and at least one perfluorinated cure site monomer (CSM).

In some embodiments, the group IIIB element-containing fillers include yttrium oxide ($Y_2O_3$), yttrium aluminum monoclinic (YAM), yttrium aluminum garnet (YAG), yttrium oxyfluoride (YOF), yttrium fluoride ($YF_3$), yttrium aluminum perovskite (YAP), erbium oxide ($Er_2O_3$), gadolinium oxide ($Gd_2O_3$), or a combination thereof.

In some embodiments, preparing the fluorine-containing elastomer composition includes mixing the curable fluorine-containing polymer, the group IIIB element-containing fillers (or the first additive), and the curative. In some embodiments, the curable fluorine-containing polymer, the group IIIB element-containing fillers, and the curative are mixed under a temperature of about 100° C. or lower. In some embodiments, the curable fluorine-containing polymer, the group IIIB element-containing fillers, and the curative are mixed for less than about 30 minutes. In some embodiments, the curable fluorine-containing polymer, the group IIIB element-containing fillers, and the curative are mixed under a temperature of about 40° C. for about 20 minutes. In some embodiments, the curable fluorine-containing polymer, the group IIIB element-containing fillers, and the curative are mixed under a temperature from about 25 to about 70° C. for about 10 to 40 minutes prior to curing the curable fluorine-containing polymer. In some embodiments, the curable fluorine-containing polymer, the group IIIB element-containing fillers (or the first additive), and the curative are placed in a mixer, and the mixing process is performed in the mixer.

In some embodiments, group IIIB element-free fillers (or the second additive) are mixed together with the curable fluorine-containing polymer, the group IIIB element-containing fillers (or the first additive), and the curative. In some embodiments, the curable fluorine-containing polymer, the group IIIB element-containing fillers (or the first additive), the group IIIB element-free fillers (or the second additive), and the curative are added into a mixer and mixed simultaneously. The group IIIB element-free fillers may serve as carrier fillers in the mixing process.

In some embodiments, after the fluorine-containing elastomer composition is prepared, the curable fluorine-containing polymer is cured to form a cured fluorine-containing elastomer composition. In some embodiments, the curing process is performed after the mixing process is completed.

In some embodiments, the curing process includes a molding process and a post-curing process. In some embodiments, the molding process is performed prior to the post-curing process. In some embodiments, the molding process is performed under a temperature lower than that for the post-curing process. In some embodiments, the molding process is performed for a time period shorter than that for the post-curing process.

In some embodiments, the molding process includes placing the mixture into a mold and heating the mold under a temperature higher than about 100° C. and for at least 2 minutes. In some embodiments, the molding process is performed under a temperature of about 100° C. to about 300° C. In some embodiments, the molding process is performed for about 2 to 10 minutes or about 5 to 10 minutes. In some embodiments, the mixture is taken out from the mixer and placed into a mold for the molding process. In some embodiments, the mixture (or the curable fluorine-containing polymer) is cured and formed (or preformed) into a molded article simultaneously in the molding process. An initial molded article may be formed after the molding process is completed.

In some embodiments, the post-curing process includes heating the initial molded article under a temperature of about 130° C. or higher. In some embodiments, the post-curing process includes heating the initial molded article for about 4 hours or longer. In some embodiments, the post-curing process is performed under a temperature of about 130° C. to about 330° C. In some embodiments, the post-curing process is performed for about 2 to 24 hours or about 4 to 6 hours. In some embodiments, the initial molded article remains disposed in the mold while the post-curing process is performed. In some embodiments, the initial molded article is fully cured and formed into the molded article. The molded article is formed of the cured fluorine-containing elastomer composition.

In some embodiments, the cured fluorine-containing elastomer composition is plasma resistant upon exposure to $CF_4$ plasma, $O_2$ plasma, $H_2$ plasma, or a combination thereof. In some embodiments, the cured fluorine-containing elastomer composition has a compression set of about 10% to about 30% or about 10% to about 25% at 70 hours at 200° C.

Presented below are examples of various fluorine-containing elastomer compositions and sample molded articles formed of cured fluorine-containing elastomer compositions according to some embodiments of the present disclosure. Table 1 includes the fluorine-containing elastomer compositions of examples E01 to E12, inspection of external appearance, and results of plasma tests and compression set of molded articles formed of the cured fluorine-containing elastomer compositions.

The $CF_4$ plasma test was performed in a testing chamber, the $CF_4$ gas was supplied into the testing chamber with the sample molded article placed inside the testing chamber, the power of the plasma source was 400 W, the temperature was 70° C., and the test was performed for 60 minutes. The $O_2$ plasma test was performed in a testing chamber, the $O_2$ gas was supplied into the testing chamber with the sample molded article placed inside the testing chamber, the power of the plasma source was 400 W, the temperature was 70° C., and the test was performed for 60 minutes. The $O_2/CF_4$ plasma test was performed in a testing chamber, the $O_2$ gas and the $CF_4$ gas were supplied into the testing chamber simultaneously with the sample molded article placed inside the testing chamber, the power of the plasma source was 800 W, the temperature was 120° C., and the test was performed for 30 minutes. The $H_2$ plasma test was performed in a testing chamber, the $H_2$ gas was supplied into the testing chamber with the sample molded article placed inside the testing chamber, the power of the plasma source was 400 W, the temperature was 70° C., and the test was performed for 60 minutes.

Figure 1B:
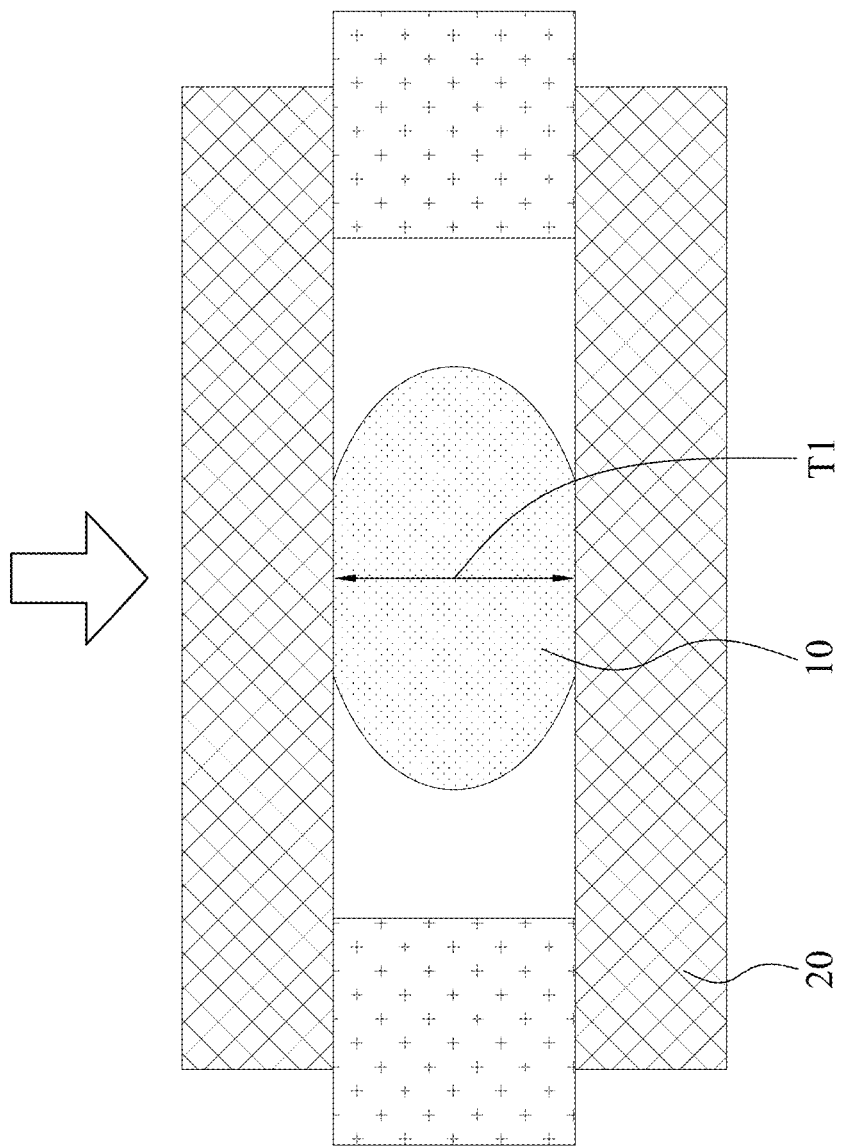
Figure 1C:
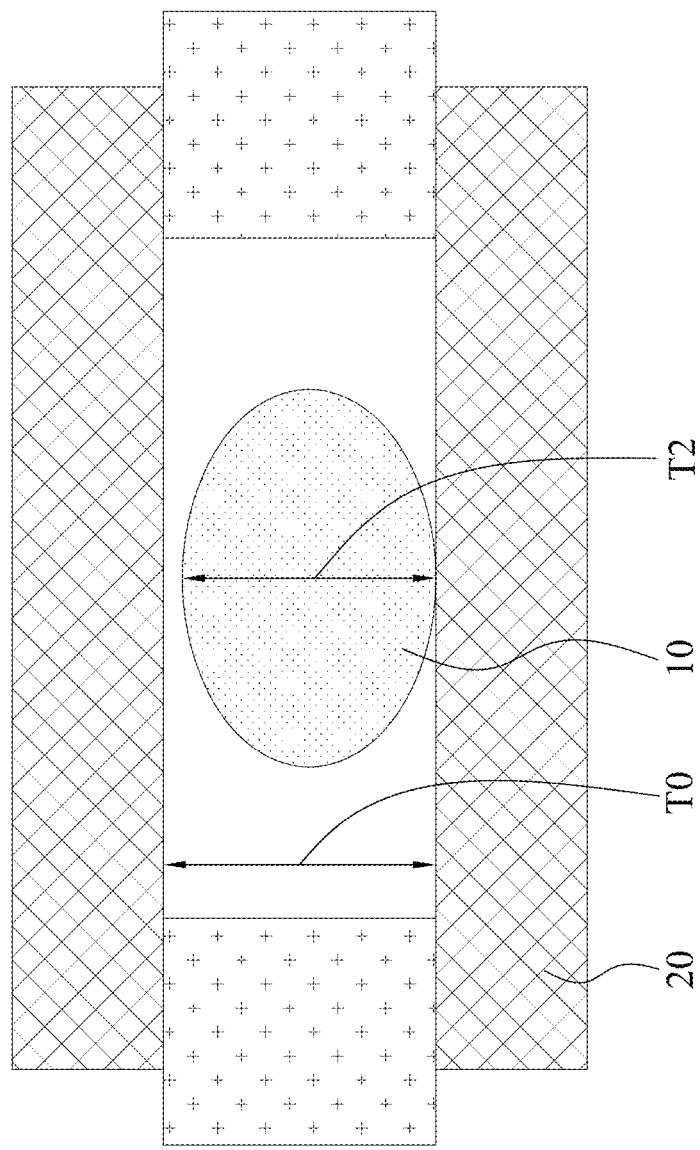

Referring to FIGS. 1A to 1C, FIGS. 1A to 1C are schematic views illustrating various steps of performing a compression set test for the sample molded articles of examples E01 to E12.

Referring to FIG. 1A, a sample molded article 10 is placed in space defined by an apparatus 20 for compression set test. The sample molded article 10 has an initial thickness T0 prior to being subjected to compression.

Referring to FIG. 1B, the sample molded article 10 is compressed by the spacer bar of the apparatus 20 to a predetermined reduced thickness T1. In some embodiments, the thickness T1 is about 75% the thickness T0. At this stage, the sample molded article 10 is heated and compressed at the same time under a temperature of 200° C. for 70 hours.

Referring to FIG. 1C, the compression force is released, and the sample molded article 10 is recovered to a thickness T2. The compression set is defined as (T0−T2)/(T0−T1). Therefore, the greater the compression set is, the worse the recovering ability the sample molded article 10 has.

In Table 1, "N/A" indicates that the test was not performed, and "--" indicates that the result is not available.

TABLE 1

| | | E01 | E02 | E03 | E04 | E05 | E07 |
|---|---|---|---|---|---|---|---|
| Material | Polymer | 100 phr of FFKM[1] | 100 phr of FFKM[1] | 100 phr of FFKM[2] | 100 phr of FFKM[2] | 100 phr of FFKM[2] | 100 phr of FFKM[3] |
| | Fillers | 10 phr of $SiO_2$ + $TiO_2$ | organic filler | 10 phr of SiC (100 nm) | 10 phr of B—SiC fiber (30/0.5 μm) | 10 phr of TiC (75 nm) | 10 phr of TiC (75 nm) |
| | Curative | — | — | 1.5 phr of 3M PFE[4] | 1.5 phr of 3M PFE[4] | 1.5 phr of 3M PFE[4] | 1.5 phr of TAIC |
| | Carrier fillers | No | No | No | No | No | 2 phr of Silica (16 nm) |
| Inspection of External Appearance | | White | Yellow | Grey | Greyish green | Black | Black |
| $CF_4$ plasma test | Weight loss (%) | 1.11 | 0.735 | 0.264 | 0.408 | 0.491 | 0.406 |
| | Residue | No | No | No | Yes | No | Yes |
| | Discoloration | No | No | Turning white | No | No | Discolored |
| $O_2$ plasma test | Weight loss (%) | 0.366 | 0.869 | 0.188 | 0.452 | 0.353 | 0.232 |
| | Residue | No | No | Yes | Yes | Yes | Yes |
| | Discoloration | No | No | No | Turning white | No | Discolored |
| $H_2$ plasma test | Weight loss (%) | 0.236 | 0.039 | 0.024 | 0.134 | 0.088 | 0.079 |
| | Residue | No | No | No | No | No | No |
| | Discoloration | No | No | Turning white | No | Discolored | Discolored |
| Compression set (%) (70 hours at 200° C.) | Test 1 | — | 17 | 23.4 | 26.1 | 58.5 | 22.7 |
| | Test 2 | — | 17 | 23.6 | 24.5 | 59.8 | 22.1 |
| | Test 3 | — | 17 | 22.6 | 25.0 | 60.9 | 24.2 |

TABLE 1-continued

|  |  | E06 | E08 | E09 | E10 | E11 | E12 |
|---|---|---|---|---|---|---|---|
| Material | Polymer | 100 phr of FFKM[2] | 100 phr of FFKM[3] | 100 phr of FFKM[5] | 100 phr of FFKM[5] | 100 phr of FFKM[5] | 100 phr of FFKM[3] |
|  | Fillers | 10 phr of $Y_2O_3$ (3 μm) | 10 phr of $Y_2O_3$ (3 μm) | 10 phr of $Y_2O_3$ (50 nm) | 10 phr of $Y_2O_3$ (1 μm) | 10 phr of $Y_2O_3$ (20 nm) | 10 phr of $Y_2O_3$ (1 μm) |
|  | Curative | 1.5 phr of 3M PFE[4] | 1.5 phr of TAIC | 3 phr of TAIC | 3 phr of TAIC | 3 phr of TAIC | 1.5 phr of TAIC |
|  | Carrier fillers | No | 2 phr of Silica (16 nm) | No | No | No | 2 phr of Silica (1 μm) |
| Inspection of External Appearance |  | Light yellow | White | White | White | White | White |
| $CF_4$ plasma test | Weight loss (%) | 0.407 | 0.433 | N/A | N/A | N/A | 0.30 |
|  | Residue | No | No | N/A | N/A | N/A | Little |
|  | Discoloration | Red spots | No | N/A | N/A | N/A | No |
| $O_2$ plasma test | Weight loss (%) | 0.456 | 0.373 | 1.75 | 2.05 | 1.46 | 0.48 |
|  | Residue | No | No | N/A | N/A | N/A | Little |
|  | Discoloration | Turning dark | No | N/A | N/A | N/A | No |
| $O_2/CF_4$ plasma test | Weight loss (%) | N/A | N/A | 1.47 | 1.86 | 1.42 | N/A |
| $H_2$ plasma test | Weight loss (%) | 0.074 | 0.056 | N/A | N/A | N/A | N/A |
|  | Residue | No | No | N/A | N/A | N/A | N/A |
|  | Discoloration | No | No | N/A | N/A | N/A | N/A |
| Compression set (%) (70 hours at 200° C.) | Test 1 | 30.2 | 22.1 | 13.72 | 16.43 | 15.59 | N/A |
|  | Test 2 | 32.1 | 23.3 | N/A | N/A | N/A | N/A |
|  | Test 3 | 33.4 | 24.6 | N/A | N/A | N/A | N/A |

[1]DuPont ™ Kalrez ® 9100;
[2]3M ™ 131 & 132 mixture;
[3]Tecnoflon ® PFR 06HC;
[4]3M ™ Dyneon ™ PFE 03C
[5]Daikin DAI-EL ® Perfluor GA-105

From the results shown in Table 1, it is apparent that with group IIIB element-containing fillers (e.g., yttrium-containing fillers) mixed in the cured fluorine-containing composition in accordance with some embodiments of the present disclosure, the as-formed molded articles have improved properties.

As shown in Table 1, the as-formed molded articles formed of the cured fluorine-containing compositions, without group IIIB element-containing fillers (e.g., yttrium-containing fillers), of examples E01, E02, E03, E04, E05, and E06 show a quality relatively poor overall compared to those of the molded articles formed of the cured fluorine-containing compositions, which include group IIIB element-containing fillers (e.g., yttrium-containing fillers), of examples E06, E08, E09, E10, E11, and E12. For example, the molded articles formed of the cured fluorine-containing compositions of examples E01, E02, and E03 show a relatively large weight loss upon exposure to $CF_4$ plasma, $O_2$ plasma, and/or $H_2$ plasma. In addition, the molded articles formed of the cured fluorine-containing compositions of examples E03, E04, E05, and E06 show residues left upon exposure to $CF_4$ plasma, $O_2$ plasma, and/or $H_2$ plasma. The aforesaid conditions of large weight loss and left-over residues suggest that the molded articles are damaged upon exposure to $CF_4$ plasma, $O_2$ plasma, and/or $H_2$ plasma. Therefore, the molded articles formed of the cured fluorine-containing compositions of examples E01, E02, E03, E04, E05, and E06 show relatively poor plasma resistant abilities.

In addition, the molded article formed of the cured fluorine-containing compositions of example E05 has a compression set exceeding 58%. This suggests that the molded article formed of the cured fluorine-containing compositions of example E05 has a relatively poor recovery ability upon compression. Therefore, it is highly disadvantageous for the cured fluorine-containing composition of example E05 to be made as resilient sealing rings used for adequately sealing a processing chamber.

As shown in Table 1, the molded articles formed of the cured fluorine-containing compositions of examples E08, E09, E10, and E11 have relatively satisfactory compression set values. For example, the molded article formed of the cured fluorine-containing composition of example E08 has a compression set that is lower than 25%, the molded article formed of the cured fluorine-containing composition of example E10 has a compression set that is lower than 2%, and the molded articles formed of the cured fluorine-containing composition of examples E09 and E11 have a compression set that is lower than 15%. This suggests that the molded articles formed of the cured fluorine-containing compositions of examples E08, E09, E10, and E11 have relatively good recovery abilities upon compression. On the other hand, the molded articles formed of the cured fluorine-containing compositions of examples E08, E09, E10, and E11 are capable of being compressed to a certain level and then recovered, rather than not compressible at all, which suggests that they are flexible rather than rigid. Therefore, it is advantageous for the cured fluorine-containing compositions of examples E08, E09, E10, and E11 to be made as resilient sealing rings used for adequately sealing a processing chamber.

As shown in Table 1, the molded articles formed of the cured fluorine-containing compositions of examples E06, E08, and E12 show relatively low weight losses and no residues or very little residues left upon exposure to $CF_4$ plasma, $O_2$ plasma, and/or $H_2$ plasma. This suggests that the molded articles are not damaged upon exposure to $CF_4$ plasma, $O_2$ plasma, and/or $H_2$ plasma, and thus no contamination particles may remain after $CF_4$ plasma, $O_2$ plasma, and/or $H_2$ plasma are supplied. The aforesaid conditions of low weight loss and no left-over residues suggest the molded articles formed of the cured fluorine-containing compositions of examples E06, E08, and E12 show excellent plasma resistant abilities. Moreover, the molded articles formed of the cured fluorine-containing compositions of examples E06 and E08 both have acceptable compression set in a range from about 15% to about 30%. Therefore, it is advantageous for the cured fluorine-containing compositions of examples E06 and E08 to be made as resilient sealing rings used for adequately sealing a processing chamber.

In addition, the molded article formed of the cured fluorine-containing compositions of examples E08 and E12 are mixed not only yttrium-containing fillers but also silica carrier fillers. Moreover, the yttrium-containing fillers and silica carrier fillers are mixed with a specific combination of weight parts and particle sizes. With the aforesaid design of the composition of the fillers, the molded article formed of the cured fluorine-containing compositions of examples E08 and E12 have a relatively low weight loss upon exposure to $CF_4$ plasma, $O_2$ plasma, and/or $H_2$ plasma, and has no residue or very little residues left upon exposure to $CF_4$ plasma, $O_2$ plasma, and/or $H_2$ plasma. Therefore, it is highly advantageous for the cured fluorine-containing composition of examples E08 and E12 to be made as resilient sealing rings used for adequately sealing a processing chamber.

Figure 2A:
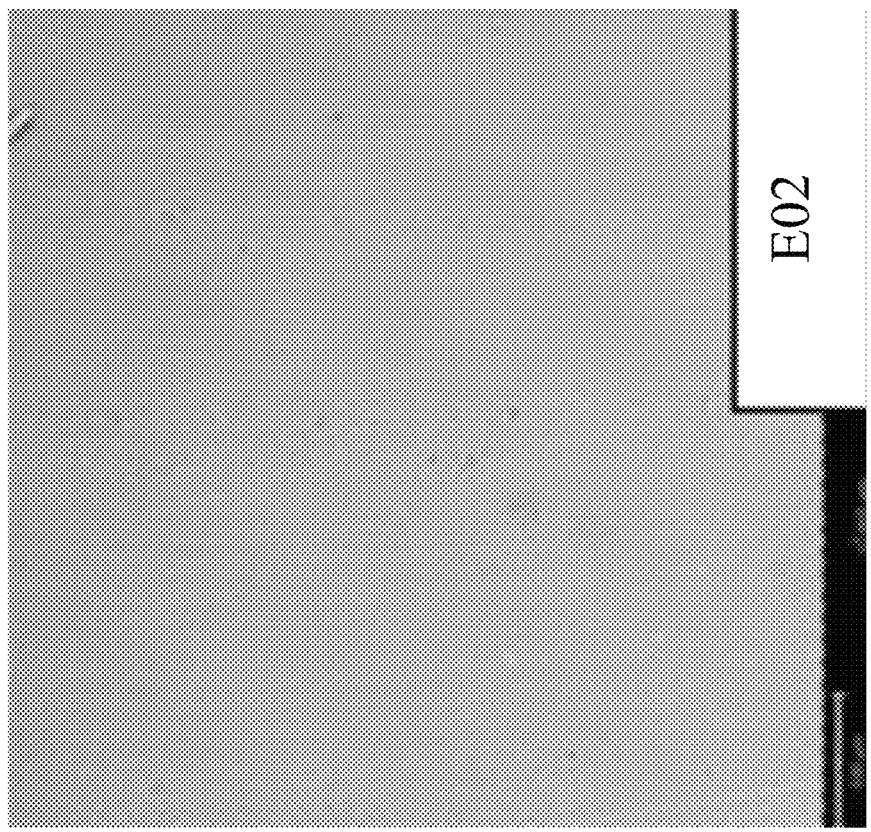
FIGS. 2A to 2H are SEM images showing surface morphologies of articles formed of a fluorine-containing composition in accordance with some embodiments of the present disclosure.
Figure 2B:
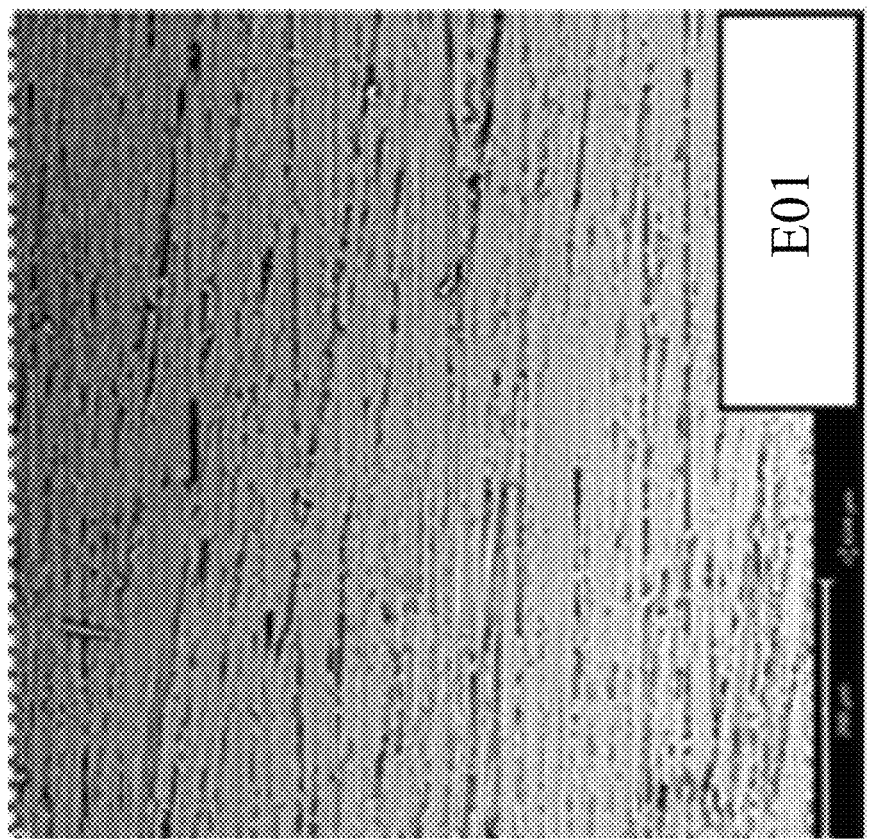
Figure 2D:
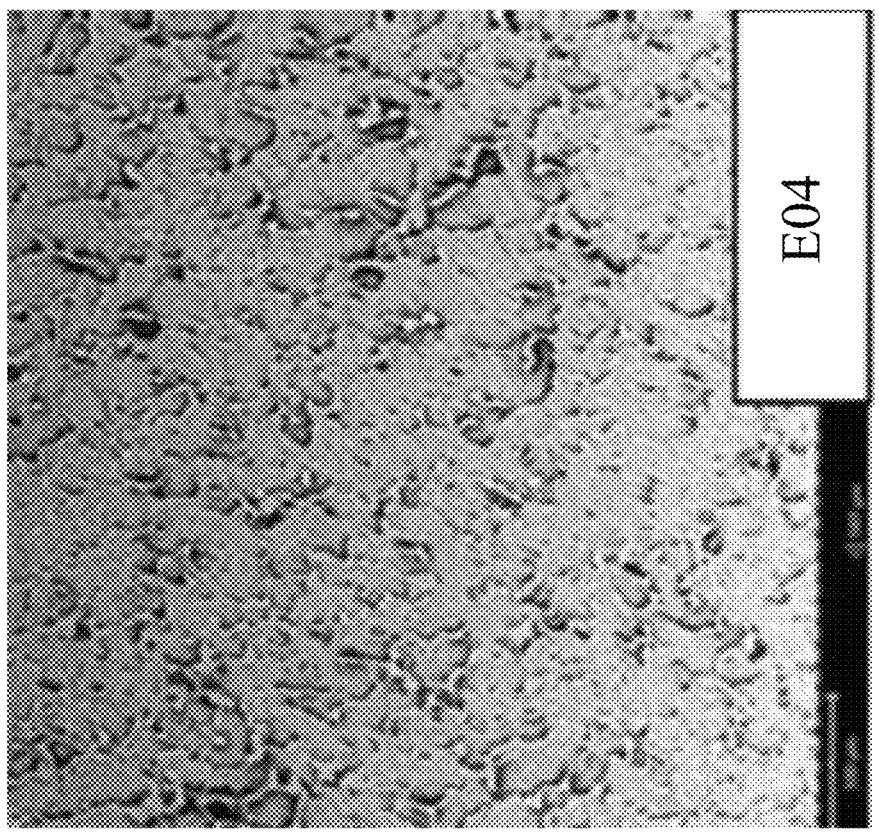
Figure 2C:
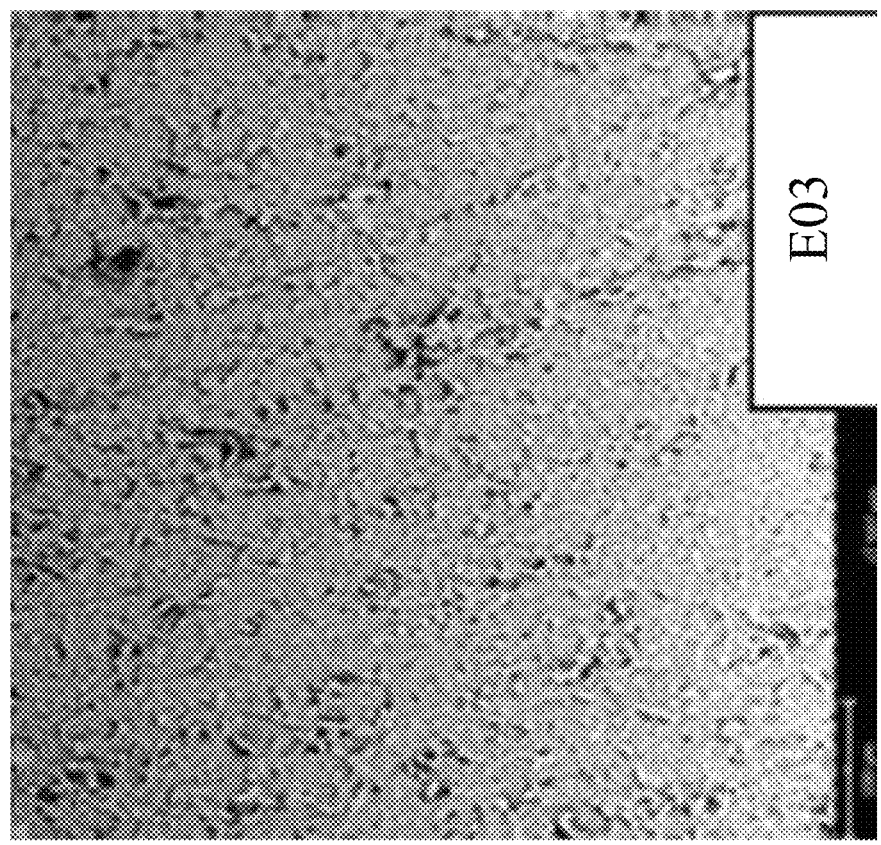
Figure 2F:
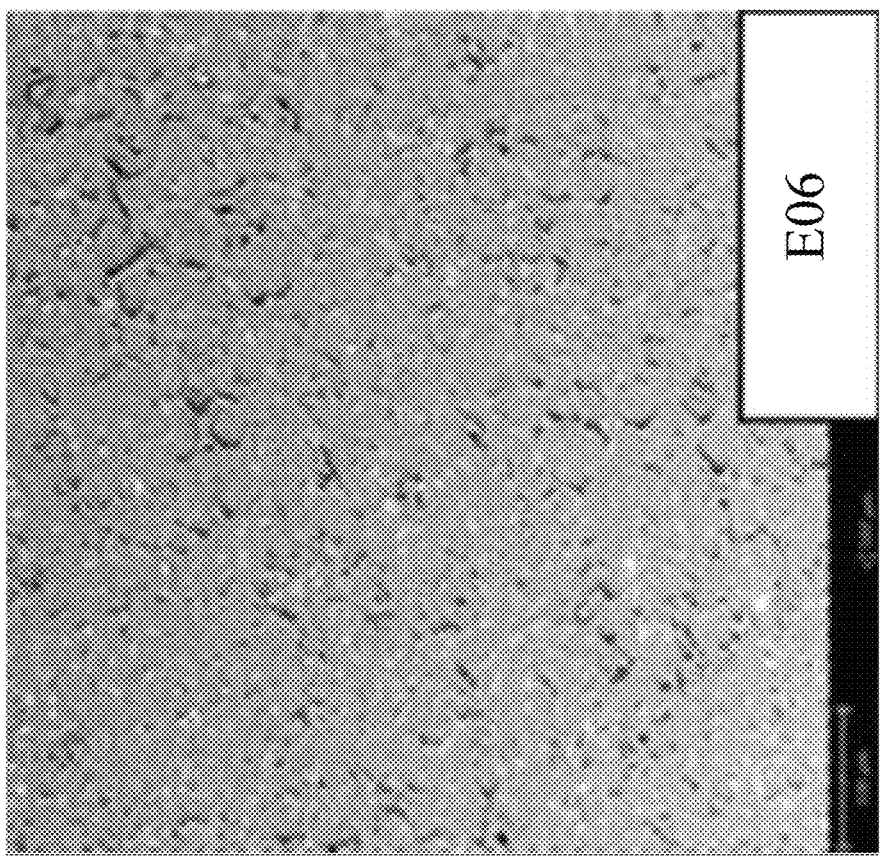
Figure 2E:
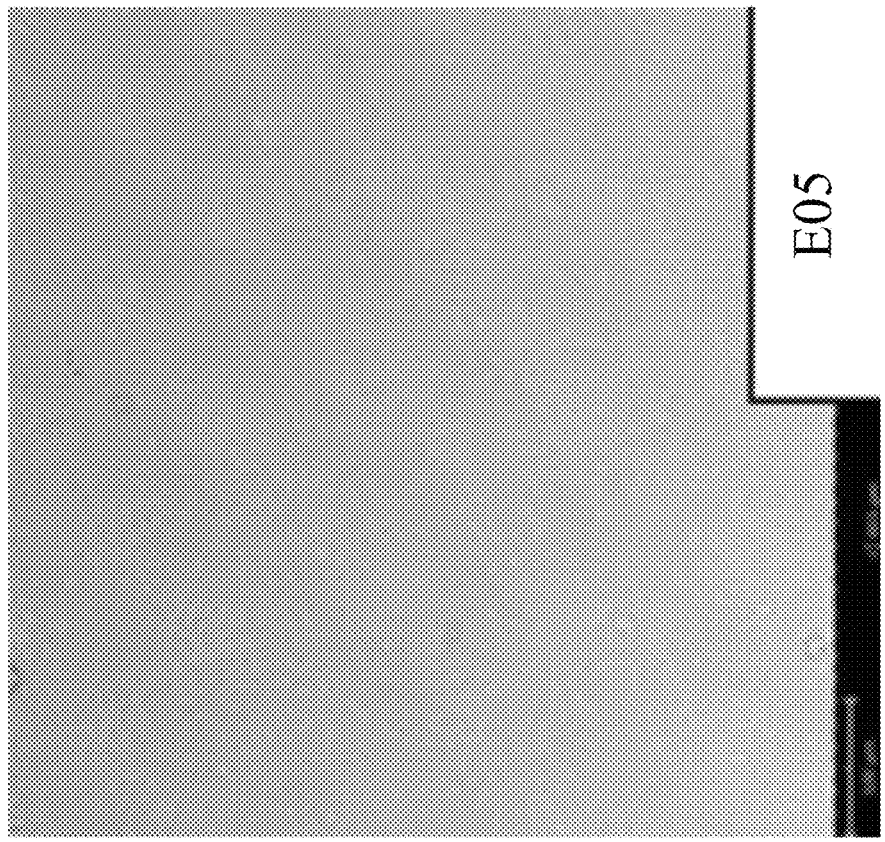
Figure 2H:
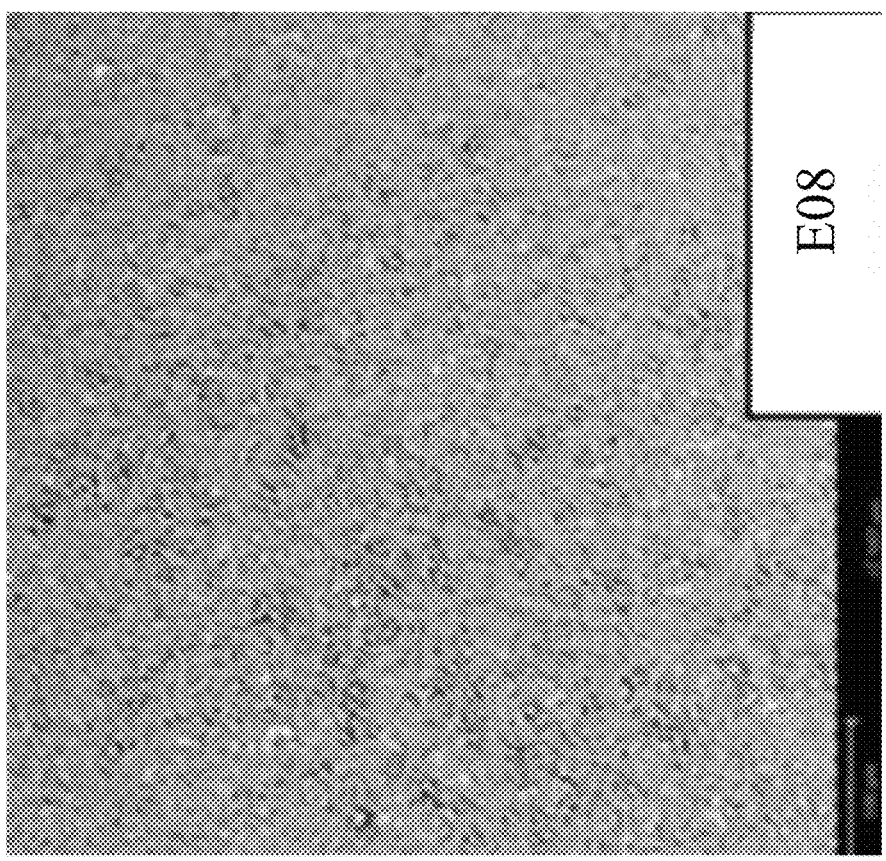
Figure 2G:
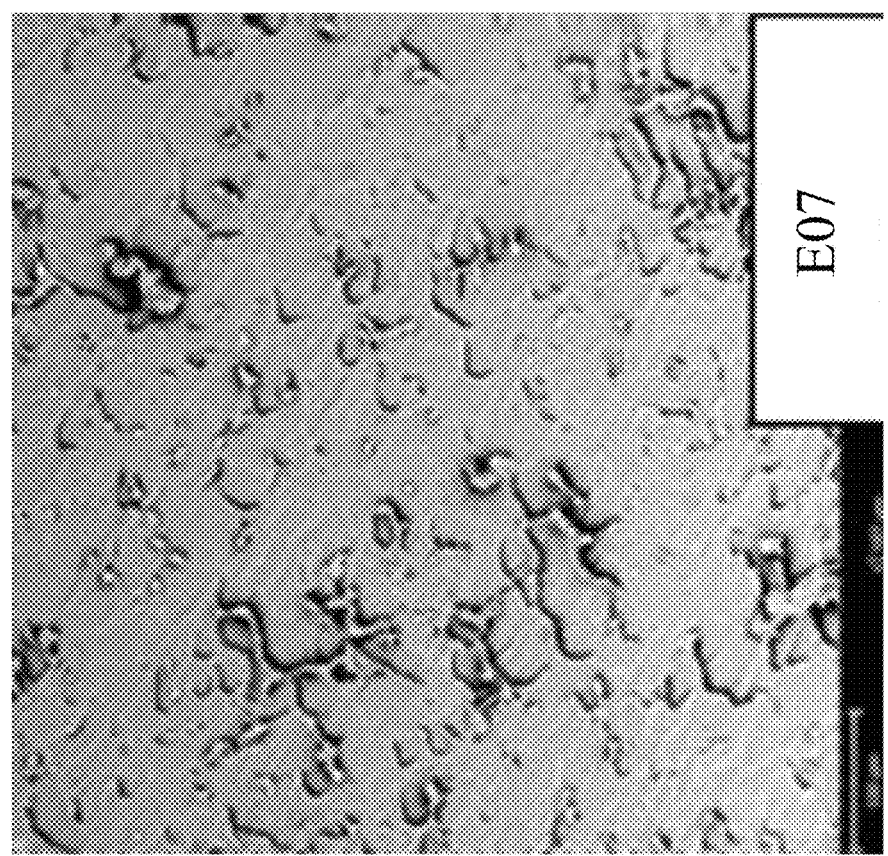

Referring to FIGS. 2A to 2G, FIGS. 2A to 2G are SEM images showing surface morphologies of articles formed of a fluorine-containing composition in accordance with some embodiments of the present disclosure. FIG. 2A is the SEM image of the surface morphology of the sample molded article formed of the cured fluorine-containing elastomer composition of example E01, FIG. 2B is the SEM image of the surface morphology of the sample molded article formed of the cured fluorine-containing elastomer composition of example E02, FIG. 2C is the SEM image of the surface morphology of the sample molded article formed of the cured fluorine-containing elastomer composition of example E03, FIG. 2D is the SEM image of the surface morphology of the sample molded article formed of the cured fluorine-containing elastomer composition of example E04, FIG. 2E is the SEM image of the surface morphology of the sample molded article formed of the cured fluorine-containing elastomer composition of example E05, FIG. 2F is the SEM image of the surface morphology of the sample molded article formed of the cured fluorine-containing elastomer composition of example E06, FIG. 2G is the SEM image of the surface morphology of the sample molded article formed of the cured fluorine-containing elastomer composition of example E07, and FIG. 2H is the SEM image of the surface morphology of the sample molded article formed of the cured fluorine-containing elastomer composition of example E08.

As shown in FIGS. 2A, 2C, 2D, and 2G, the molded articles formed of the cured fluorine-containing compositions of examples E01, E03, E04, and E07 show rough and non-uniform surface morphology. This suggests that the group IIIB element-free fillers (e.g., silicon oxide, titanium oxide, silicon carbide, and titanium carbide) show poor compatibility with the curable fluorine-containing polymer FFKM. The poor compatibility may cause structural defects which may easily lead to contamination particles falling off during a semiconductor manufacturing process. As for FIGS. 2B and 2E which show the molded articles formed of the cured fluorine-containing compositions of examples E02 and E05, respectively, the cured fluorine-containing compositions of example E02 does not include any inorganic fillers, and thus the surface morphology is smooth. In addition, Table 1 already shows that the molded article formed of the cured fluorine-containing composition of example E05 shows residues left upon exposure to $CF_4$ plasma, $O_2$ plasma, and/or $H_2$ plasma and has a compression set exceeding 58%.

As shown in FIGS. 2F and 2H, the molded articles formed of the cured fluorine-containing compositions of examples E06 and E08 show uniform surface morphology. This suggests that the group IIIB element-containing fillers (e.g., yttrium-containing fillers) show relatively good compatibility with the curable fluorine-containing polymer FFKM. The relatively good compatibility indicates that no structural defects are formed, and contamination particles are hardly generated during a semiconductor manufacturing process.

Some embodiments of the present disclosure provide a fluorine-containing elastomer composition. The fluorine-containing elastomer composition includes a curable fluorine-containing polymer comprising at least one fluorinated cure site monomer having a cure site; a group IIIB element-containing reinforcing additive in an amount of 8 to 15 weight parts with respect to 100 weight parts of the curable fluorine-containing polymer; and a curative configured for curing the at least one fluorinated cure site monomer.

Some embodiments of the present disclosure provide a fluorine-containing elastomer composition. The fluorine-containing elastomer composition includes a curable fluorine-containing polymer comprising at least one fluorinated cure site monomer having a cure site; a plurality of group IIIB element-containing fillers in an amount of 8 to 12 weight parts with respect to 100 weight parts of the curable fluorine-containing polymer; and a curative configured for curing the at least one fluorinated cure site monomer.

Some embodiments of the present disclosure provide a method for making a cured fluorine-containing elastomer composition. The method includes following operations: preparing a fluorine-containing elastomer composition, including mixing: a curable fluorine-containing polymer comprising at least one fluorinated cure site monomer having a cure site; a plurality of group IIIB element-containing fillers in an amount of 8 to 12 weight parts with respect to 100 weight parts of the curable fluorine-containing polymer; and a curative configured for curing the at least one fluorinated cure site monomer; and curing the curable fluorine-containing polymer to form a cured fluorine-containing elastomer composition.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fluorine-containing elastomer composition, comprising:
   a curable fluorine-containing elastomer comprising units derived from at least one fluorinated cure site monomer having a cure site;
   a group IIIB element-containing reinforcing additive in an amount of 8 to 15 weight parts with respect to 100 weight parts of the curable fluorine-containing elastomer, wherein the group IIIB element-containing reinforcing additive comprises a mixture of a first additive being a group IIIB element-containing additive and silica, and the silica has an average particle size of about 16 nm to 1 μm; and
   a curative configured for curing the curable fluorine-containing elastomer.

2. The fluorine-containing elastomer composition of claim 1, wherein the group IIIB element-containing reinforcing additive is in an amount of 8 to 12 weight parts with respect to 100 weight parts of the curable fluorine-containing elastomer.

3. The fluorine-containing elastomer composition of claim 1, wherein an amount in weight parts of the silica is greater than 0 to about 0.3 times an amount in weight parts of the first additive.

4. The fluorine-containing elastomer composition of claim 3, wherein the first additive comprises yttrium oxide ($Y_2O_3$), yttrium aluminum monoclinic (YAM), yttrium aluminum garnet (YAG), yttrium oxyfluoride (YOF), yttrium fluoride ($YF_3$), yttrium aluminum perovskite (YAP), erbium oxide ($Er_2O_3$), gadolinium oxide ($Gd_2O_3$), or a combination thereof.

5. The fluorine-containing elastomer composition of claim 4, wherein the first additive has an average particle size of about 15 nm to about 3.5 μm.

6. The fluorine-containing elastomer composition of claim 4, wherein a ratio of an average particle size of the first additive to an average particle size of the silica is about 1.25 to about 190.

7. The fluorine-containing elastomer composition of claim 1, wherein the cure site is selected from the group consisting of a chloro group, a bromo group, an iodine group, a cyano group, a phenoxy group, a carbonyl group, and an alkoxycarbonyl group.

8. A fluorine-containing elastomer composition, comprising:
   a curable fluorine-containing elastomer comprising units derived from at least one fluorinated cure site monomer having a cure site;
   a plurality of group IIIB element-containing fillers in an amount of 8 to 12 weight parts with respect to 100 weight parts of the curable fluorine-containing elastomer;
   silica having an average particle size of about 16 nm to 1 μm; and
   a curative configured for curing the curable fluorine-containing elastomer.

9. The fluorine-containing elastomer composition of claim 8, wherein the curable fluorine-containing elastomer comprises a perfluoroelastomer (FFKM), a fluoroelastomer (FKM), a fluoro vinyl methyl siloxane (FVMQ), or a combination thereof.

10. The fluorine-containing elastomer composition of claim 8, wherein the group IIIB element-containing fillers comprise a material selected from the group consisting of yttrium oxide ($Y_2O_3$), yttrium aluminum monoclinic (YAM), yttrium aluminum garnet (YAG), yttrium oxyfluoride (YOF), yttrium fluoride ($YF_3$), yttrium aluminum perovskite (YAP), erbium oxide ($Er_2O_3$), and gadolinium oxide ($Gd_2O_3$).

11. The fluorine-containing elastomer composition of claim 10, wherein the group IIIB element-containing fillers have an average particle size of about 20 nm to about 3 μm.

12. The fluorine-containing elastomer composition of claim 8, wherein the silica is in an amount of less than 3 weight parts with respect to 100 weight parts of the curable fluorine-containing elastomer.

13. The fluorine-containing elastomer composition of claim 12, wherein the group IIIB element-containing fillers have an average particle size of about 1 μm to about 3 μm, and the silica has an average particle size of about 1 μm.

14. The fluorine-containing elastomer composition of claim 13, wherein the silica has an average particle size of about 16 nm to about 20 nm.

15. A fluorine-containing elastomer composition, comprising:
   a curable fluorine-containing elastomer comprising units derived from at least one fluorinated cure site monomer having a cure site;
   a plurality of group IIIB element-containing fillers in an amount of 8 to 12 weight parts with respect to 100 weight parts of the curable fluorine-containing elastomer;
   silica in an amount of 0.5 to 3 weight parts with respect to 100 weight parts of the curable fluorine-containing elastomer; and
   a curative configured for curing the curable fluorine-containing elastomer,
   wherein the group IIIB element-containing fillers have an average particle size of about 1 μm to about 3 μm, and the silica has an average particle size of about 16 nm to 1 μm.

16. The fluorine-containing elastomer composition of claim 15, wherein an amount in weight parts of the group IIIB element-containing fillers is about 3 to 7 times an amount in weight parts of the silica.

17. The fluorine-containing elastomer composition of claim 15, wherein the group IIIB element-containing fillers comprise yttrium-containing fillers, and the curable fluorine-containing elastomer comprises a perfluoroelastomer (FFKM).

18. The fluorine-containing elastomer composition of claim 15, wherein the group IIIB element-containing fillers comprise yttrium-containing fillers, the group IIIB element-containing fillers have an average particle size of about 20 nm to about 3 μm, and an amount in weight parts of the silica is about 0.2 times an amount in weight parts of the group IIIB element-containing fillers.

19. The fluorine-containing elastomer composition of claim 15, wherein the group IIIB element-containing fillers comprise yttrium oxide ($Y_2O_3$).

20. The fluorine-containing elastomer composition of claim 19, wherein the group IIIB element-containing fillers have an average particle size of about 3 μm, and the silica has an average particle size of about 16 nm.

* * * * *